May 19, 1936.  G. J. BARRY  2,041,106
INDICATING DEVICE FOR RADIO RECEIVERS
Filed March 11, 1935  2 Sheets-Sheet 1
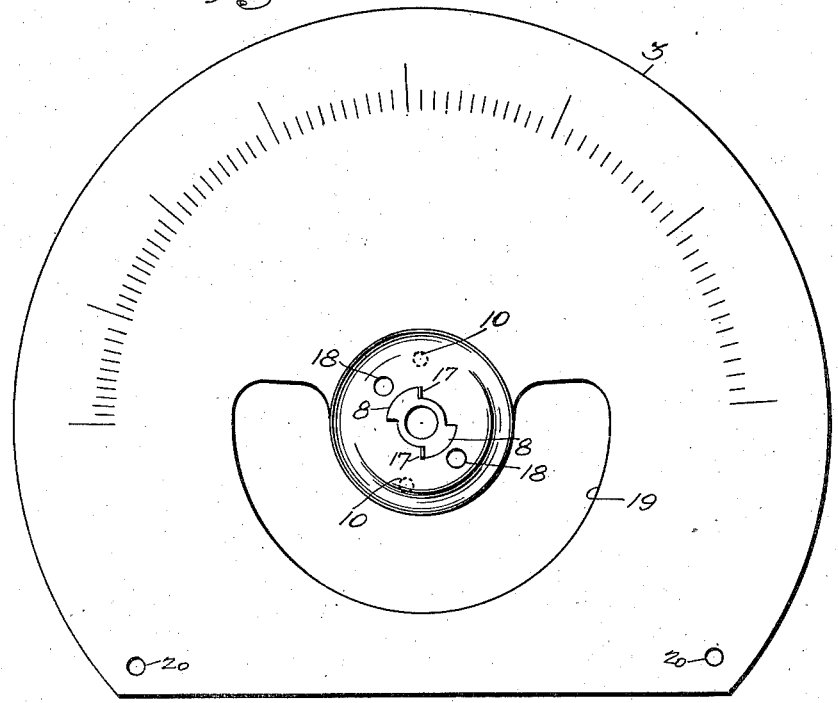
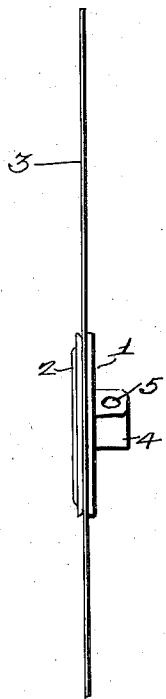
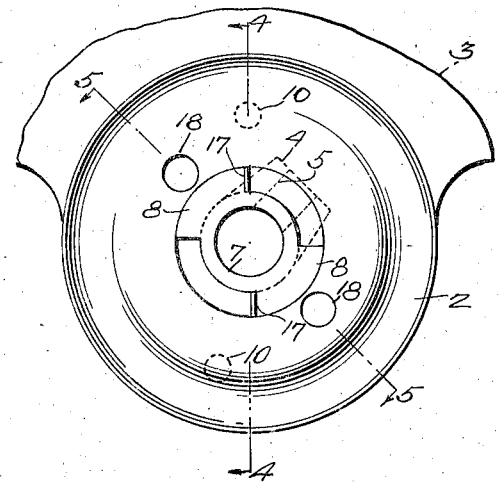
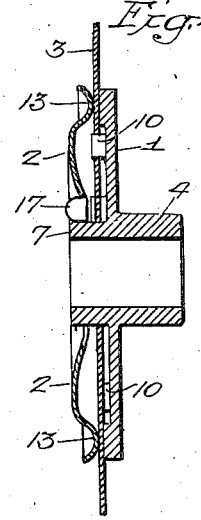
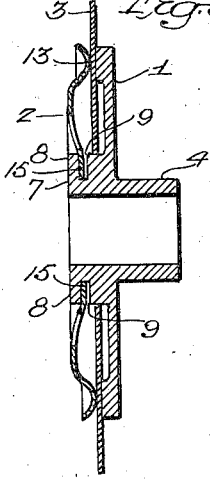
Inventor
Gerald J. Barry
by his Attorneys
Howson & Howson May 19, 1936.  G. J. BARRY  2,041,106
INDICATING DEVICE FOR RADIO RECEIVERS
Filed March 11, 1935  2 Sheets-Sheet 2
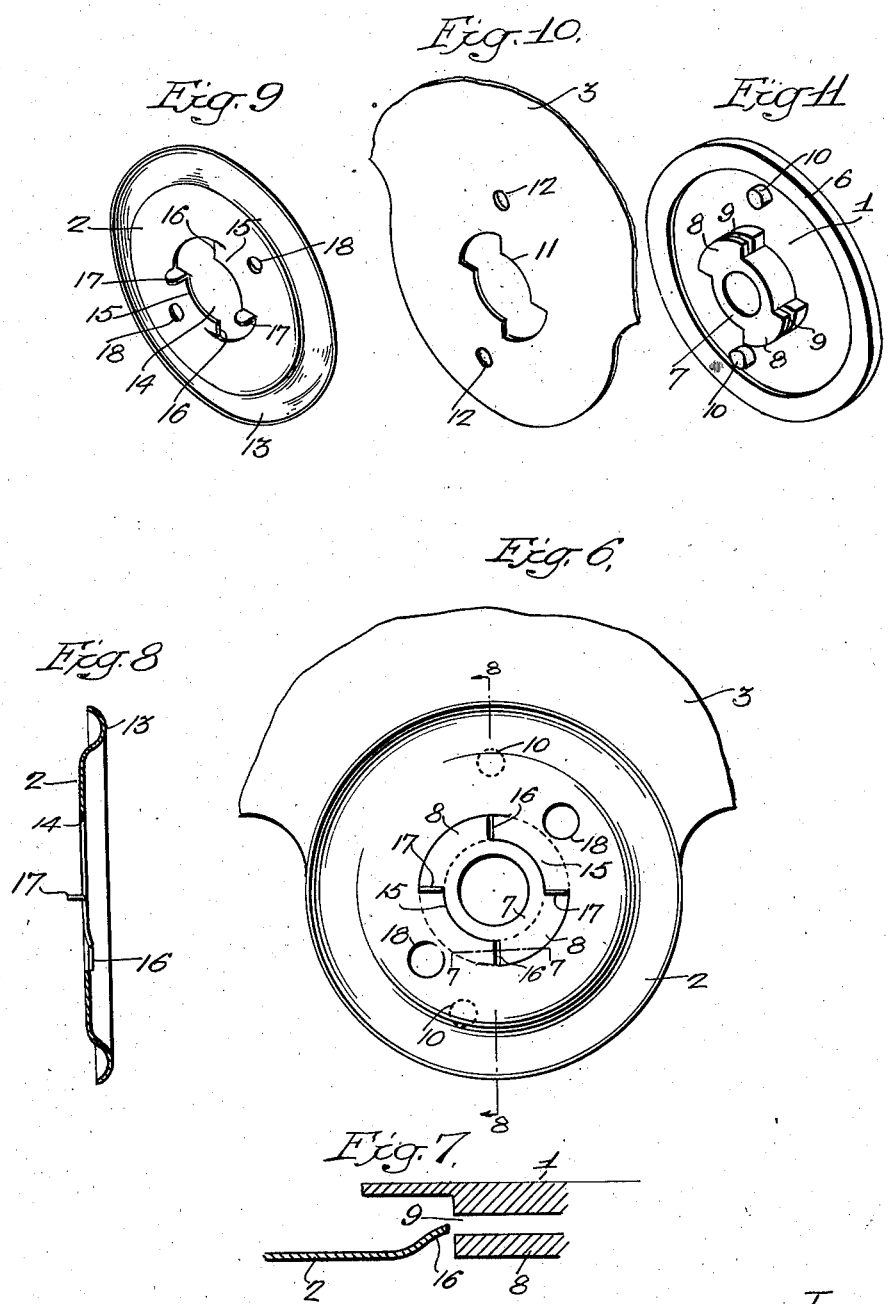
Inventor:
Gerald J. Barry
by his Attorneys
Howson & Howson Patented May 19, 1936

2,041,106

UNITED STATES PATENT OFFICE 2,041,106

INDICATING DEVICE FOR RADIO RECEIVERS

Gerald J. Barry, Philadelphia, Pa., assignor to Philco Radio & Television Corporation, Philadelphia, Pa., a corporation of Delaware Application March 11, 1935, Serial No. 10,566

4 Claims. (Cl. 116—124.2)

This invention relates to detachable assembly devices for removably attaching an element, such as a radio receiver indicator dial, to a member such as a rotating shaft. While the invention is directed particularly to indicating devices for radio receivers, it is capable of use in any instance where it may serve the general purpose in view.

The main object of the invention, therefore, is to provide means whereby the indicating dial of a radio receiver may be detachably mounted on the tuning shaft of the radio receiver so that the dial may be easily removed and replaced if desired or necessary.

Another object of the invention is to provide a radio dial assembly which is economic and easy to manufacture.

Heretofore, it has been the practice to mount the indicating dial of a radio receiver on a face plate by means of small eyelets, the face plate being adapted for attachment to the tuning shaft. The dial generally consists of a semi-circular disk formed of celluloid or other semi-transparent material. This method of manufacture and assembly of the dial structure is relatively expensive and is objectionable for the reason that it is difficult to replace the dial when this is desired or necessary. This is ofttimes made necessary by breakage of the dial in production. Moreover, it is often desirable or necessary to replace the dial due to changes in the transmitting frequencies of transmitting stations from time to time, which necessitates replacement of the dial with a new one bearing the proper indicia or legends when the names of the several stations are indicated on the dial. By the present invention, there is provided a device which fully meets all of these requirements both in production or manufacture and use.

The invention is exemplified by the preferred form thereof illustrated on the accompanying drawings to which reference may be had for a complete understanding of the invention.

In the drawings:

Fig. 1 is a face view of the assembled structure with the parts thereof in interlocked condition;

Fig. 2 is a side view of the same;

Fig. 3 is an enlarged fragmentary view of the central part of the structure;

Fig. 4 is a sectional view taken along line 4—4 of Fig. 3;

Fig. 5 is a sectional view taken along line 5—5 of Fig. 3;

Fig. 6 is a view similar to Fig. 3 showing the parts in unlocked condition;

Fig. 7 is a fragmentary section along line 7—7 of Fig. 6;

Fig. 8 is a sectional view of the locking plate taken along line 8—8 of Fig. 6;

Fig. 9 is a perspective view of the locking plate;

Fig. 10 is a fragmentary perspective of the dial or disk; and

Fig. 11 is a perspective view of the face plate.

Referring particularly to Figs. 1 and 2, the device comprises essentially a face plate 1, a locking plate 2, and the indicator dial 3 adapted to be clamped between the two plates. The face plate 1 may be formed of any suitable metal and may be relatively rigid, while the locking plate 2 may take the form of a thin metal plate or disk formed of resilient material such as copper or phosphor-bronze. The dial member or disk 3 may be formed of semi-transparent sheet material such as above mentioned. The indicator dial may have the usual indicia or graduations thereon indicating various frequencies or wave lengths of the transmitting stations. If desired, the names of the several stations may also be indicated. It will be understood that a plurality of scales may be provided on the dial where desired, as in the case of the modern multi-band receiver and that the dial may be of any desired size to accommodate such scale markings.

The face plate 1 is adapted for attachment to a rotatable element such as the tuning shaft of the receiver. To this end, there may be provided on the face plate the rearwardly-extending hub portion 4 having a tapped hole 5 therein for the reception of a set screw. As shown more clearly in Fig. 11, the face plate has a small rim 6 at its outer edge and is provided with a forwardly-extending hub portion 7 having diametrically-opposed arcuate portions 8 with arcuate peripheral slots 9 therein. On the front face of the face plate, there are provided integral projections or lugs 10 and, as shown more clearly in Figs. 3 and 6, these lugs are preferably offset slightly with respect to a diameter of the plate.

The indicator dial or disk 3 is provided with a central aperture 11 (see Fig. 10) of the shape or configuration of the projecting hub portion 7 of the face plate 1 so as to snugly receive the said hub portion. The dial is also provided with apertures 12 of such size and location as to snugly receive the lugs 10 when the dial is placed against the face plate and over the hub portion 7 thereof. It will now be seen that the lugs 10 and apertures 12 serve to interlock the dial with the face plate so as to prevent relative rotary movement between these elements. The purpose of having the lugs 10 offset with respect to one another as above mentioned is to insure proper positioning of the indicator dial upon the face plate. This result could also be accomplished by having the lugs 10 of different size rather than of the same size and, in such case, the lugs could be diametrically opposite one another.

When the indicator dial is positioned on the face plate against the rim 6 thereof, as illustrated in Fig. 5, the arcuate slots or grooves 9 are positioned forwardly of the indicator dial. The resilient locking plate 2 (see Figs. 8 and 9) has its peripheral edge bent or rounded to provide the rearwardly-extending rim 13 and is provided at its center with an aperture 14 of the shape or configuration of the projecting hub portion 7 of the face plate 1 so as to snugly receive the same. The arcuate edges 15 of the locking plate are adapted to enter the slots 9 of the hub portion 7 when the locking plate is placed over the hub portion 7, as in Fig. 6, and turned relative thereto to the position of Figs. 1 and 3. This serves to lock the parts of the device together. To facilitate the locking operation, the edges 16 are turned inwardly, as shown more clearly in Fig. 7, so that these edges may readily enter the ends of slots 9. The edges 17 are turned outwardly to provide stops which limit the rotation of the locking plate and prevent rotation thereof to such an extent as would cause unlocking of the plate. To facilitate rotation of the locking plate, there are provided diametrically-opposed apertures 18 which are adapted to receive the prongs of a U-shaped tool by means of which the locking plate may be rotated.

As shown in Figs. 4 and 5, when the locking plate is lockingly attached to the projecting hub 7 of the face plate, as above described, the central portion of the locking plate is flexed inward and this causes greater pressure of the rim 13 against the indicator dial. The dial is thus securely clamped by the rim 13 of the locking plate against the rim 6 of the face plate. At the same time, rotation of the dial relative to the face plate is prevented by the interlocking means above described. The manner of assembly and detachment of the parts will be understood from the above description and it will be seen that the parts may be easily assembled and locked together and may be easily detached. At the same time, the device functions effectively to secure the dial to the face plate. The only operation required to attach or detach the elements, other than placing them in cooperative relation, is the slight turning of the locking plate to lock the elements together.

In the specific device illustrated, the dial 3 is provided with a relatively large arcuate aperture 19 which is adapted to accommodate elements of the tuning mechanism. This, however, forms no part of the present invention. The two small holes 20 may be provided in the dial and may be used to key the dial in the processes of printing or inscribing the indicia thereon, so that the indicia are properly located with respect to the mounting apertures.

Although a preferred form of the device has been illustrated and described for the purpose of disclosing the invention, it will be understood that various changes and modifications may be made without departing from the scope of the invention. For example, the specific interlocking means of the elements may be varied and other changes may be made such as would occur to persons skilled in the art.

I claim:

1. A detachable assembly for radio dials and the like, comprising a face plate adapted for attachment to a shaft and having a projecting hub portion of distinctive shape with an arcuate slot, a disk adapted to be placed against said plate and having an aperture shaped to receive said hub portion, interlocking means on said plate and said disk to prevent relative rotation therebetween, and a resilient locking plate adapted to be placed against said disk and having an aperture shaped to receive said hub portion and an edge portion adapted to enter said slot when said locking plate is slightly rotated.

2. A detachable assembly for radio dials and the like, comprising a face plate adapted for attachment to a shaft and having a projecting hub portion of distinctive shape with an arcuate slot, a disk adapted to be placed against said plate and having an aperture shaped to receive said hub portion, said plate having a plurality of projections and said disk having a plurality of corresponding cooperative apertures for preventing relative rotation between the plate and the disk, and a resilient locking plate adapted to be placed against said disk and having an aperture shaped to receive said hub portion and an edge portion adapted to enter said slot when said locking plate is slightly rotated.

3. A detachable assembly for radio dials and the like, comprising a face plate adapted for attachment to a shaft and having a projecting hub portion of distinctive shape with an arcuate slot, a disk adapted to be placed against said plate and having an aperture shaped to receive said hub portion, interlocking means carried on said plate and said disk to prevent relative rotation therebetween, a resilient locking plate adapted to be placed against said disk and having an aperture shaped to receive said hub portion and an edge portion adapted to enter said slot when said locking plate is slightly rotated, and a stop on said edge portion to limit rotation of said locking plate.

4. A detachable assembly for radio dials and the like, comprising a face plate adapted for attachment to a shaft and having a projecting hub portion of distinctive shape with an arcuate slot, a semi-transparent self-supporting dial adapted to be placed against a surface of said plate and having an aperture shaped to receive said hub portion, interlocking means carried on said plate and said dial to prevent relative rotation therebetween, a resilient locking plate adapted to be placed against said dial and having an aperture shaped to receive said hub portion and an edge portion adapted to enter said slot when said locking plate is slightly rotated, and a stop on said edge portion to limit rotation of said locking plate.

GERALD J. BARRY.